March 27, 1956   W. W. SCHULTZ   2,740,050
PHOSPHOR SCREEN AND METHOD OF MAKING THE SAME
Filed March 15, 1952
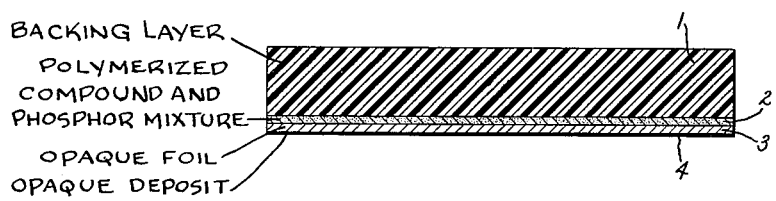
Inventor:
Warner W. Schultz,
by Paul A. Frank
His Attorney.

United States Patent Office 2,740,050
Patented Mar. 27, 1956

2,740,050
PHOSPHOR SCREEN AND METHOD OF MAKING THE SAME

Warner W. Schultz, Schenectady, N. Y., assignor to General Electric Company, a corporation of New York Application March 15, 1952, Serial No. 276,795

8 Claims. (Cl. 250—80)

This invention relates generally to phosphor screens and methods of making such screens; more particularly, this invention relates to the production of improved phosphor screens adaptable to a wide variety of applications.

This application is a continuation in part of my copending application, Serial No. 232,693, filed June 21, 1951, and assigned to the assignee of the present invention.

In the preparation of phosphor screens, it has been customary to deposit the phosphorescent material upon a backing layer by means of liquid settling wherein the phosphorescent material is mixed with binding material, electrolyte, etc., and allowed to settle upon the backing layer to which it becomes attached. This process is beset with a great number of problems in that it is very difficult to obtain uniformly deposited, hole-free layers of phosphorescent material in a relatively short time.

It is, therefore, a principal object of the present invention to provide a means for preparing a phosphor screen having a phosphorescent layer which is uniform and hole-free.

It is another object of the present invention to provide a means for producing a phosphor screen in a relatively short time.

It is a further object of the invention to provide a phosphor screen which does not transmit light therethrough but which emits light in response to the impingement thereupon of alpha particles, etc.

Briefly stated, this invention comprises the mixing of a powdered phosphorescent material such as zinc sulphide with a monomer such as anaerobic permafil, an oxygenated composition which may be prepared in a manner hereinafter described. The mixture is applied by pouring or painting or otherwise upon a light-transmissible backing layer of plastic material such as solid polymeric methyl methacrylate. The mixture is then compressed between the backing layer and a flat surface to exclude air therefrom, whereby the anaerobic permafil polymerizes to form a composite phosphor screen consisting of the backing layer, the phosphorescent material, and the permafil. After the polymerization is completed, the flat surface is removed. If it is desired to prevent the transmission of light through the screen, a layer of aluminum foil or other opaque material may be positioned between the flat surface and the permafil-phosphor mixture before the mixture is compressed. After polymerization, the phosphor-permafil mixture adheres to both the plastic material and the aluminum, thereby producing a nearly light opaque phosphor screen. Complete light opaqueness may be obtained by coating the exposed surface of the aluminum with an opaque liquid such as india ink.

Additional features, objects, and advantages of the invention will be apparent from the following description, taken with the accompanying figure which shows a cross-section view of a phosphor screen according to the invention.

Referring now to the figure, there is shown a light-transmissible backing member or layer 1 consisting of a plastic material such as solid polymeric methyl methacrylate which may be cut to the shape desired for the phosphor screen to be produced. Backing layer 1 may also consist of glass which has been thoroughly decontaminated so that its lower surface is free from foreign substances. Since the shape of backing layer 1 will determine the shape of the phosphor screen to be produced, it should be cut to the desired form before the screen is prepared. The thickness of backing layer 1 is, in general, immaterial and may be of the order of $\frac{1}{16}$ to $\frac{1}{4}$ inch.

Layer 2 consists of a mixture of anaerobic permafil and a suitable phosphor in powder or comminuted form. The anaerobic permafil preferably is a liquid, low viscosity, oxygenated tetraethylene glycol dimethacrylate prepared as described in copending patent application Serial No. 176,768, filed July 29, 1950, by R. E. Burnett and B. W. Nordlander, now issued as Patent No. 2,628,178 on February 10, 1953, and assigned to the assignee of the present invention, however, if desired, any other of the specific materials listed in column 3 of the Burnett & Nordlander patent may be used. Briefly speaking, the anaerobic permafil may be prepared by forming a mixture of ingredients which comprise tetraethylene glycol dimethacrylate, water, and a small amount of an organic peroxide as an organic accelerator. The latter mixture is emulsified and then oxygen is passed through the emulsified mixture for a time sufficient to increase the final active oxygen content of the tetraethylene glycol dimethacrylate above 0.1%. While the passage of the oxygen is being conducted, the temperature of the emulsified mixture is maintained above 25° C. This process produces a liquid composition which polymerizes when oxygen is excluded from contact with the surface thereof.

As set forth in the aforementioned Patent 2,628,178, the anaerobic permafil may be prepared from a monomeric compound corresponding to the general formula:

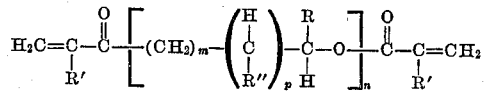

where R is a member selected from the class consisting of hydrogen, —CH₃, —C₂H₅, —CH₂OH,

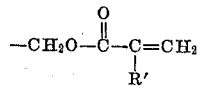

R' is a member selected from the class consisting of hydrogen, chlorine, —CH₃, and —C₂H₅, R" is a member selected from the class consisting of hydrogen, —OH, and

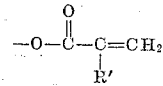

m is an integer equal to at least 1, n is an integer equal to at least 2, and p is one of the following: 0, 1. Among the materials corresponding to that general formula are: diethylene glycol dimethacrylate, triethylene glycol dimethacrylate, tetraethylene glycol dimethacrylate, dipropylene glycol dimethacrylate, polyethylene glycol dimethacrylate, di-(pentamethylene glycol) dimethacrylate, tetraethylene glycol diacrylate, tetraethylene glycol di-(chloroacrylate), diglyceral diacrylate, diglycerol tetramethacrylate, etc.

The anaerobic permafil-phosphor mixture, which should have the consistency of a thin paste, is applied by pouring, painting or spraying it upon the surface of backing layer 1 to form a thin layer thereupon. After the mixture has been applied, backing layer 1 is compressed, preferably downwardly, against the flat surface of a member of glass (not shown in the figure) to exclude oxygen from the permafil-phosphor mixture and cause polymerization of the permafil. When the polymerization is completed and the mixture thoroughly hardened, the member of glass is removed, leaving a phosphor screen consisting of backing layer 1 and phosphorescent layer 2. Backing layer 1 is preferably compressed downwardly against the flat surfaced member in order that the phosphor particles will settle adjacent the exterior surface of the screen and thus prevent the wasteful absorption of incident radiation by the permafil before phosphorescence is produced.

In order that the flat surfaced member against which layer 2 is compressed will not adhere to the permafil, thereby preventing its subsequent removal, a mold release agent should be applied to the flat surface. A suitable mold release agent is ordinary soap, a thin layer of which is deposited upon the flat surface in any convenient manner, such as by rubbing. Thereafter, the flat surface should be washed thoroughly with tap water so that all visible traces of the soap are removed and a monolayer of the mold release agent is left upon the flat surface. Ordinary paste floor wax will also serve as a suitable mold release agent. This may be applied by rubbing a thin layer on the flat surface and then removing all visible traces with an absorbent paper tissue. In general, mold release agents are well known and may be obtained from a number of sources referred to in the "Green Book, Buyers Directory," compiled by the "Oil, Paint and Drug Reporter" and published by Schnell Publishing Company, 30 Church Street, New York, N. Y.

Depending upon the application, any suitable phosphor in powder form may be employed in the production of a screen according to the invention. Zinc sulphide activated with silver, cadmium tungstate, zinc cadmium sulphide, and cadmium sulphide may each be employed with efficacy when a screen for the detection of alpha particles is desired. Anthracene, thallium activated sodium iodide, zinc sulphide, and stilbene are suitable for the detection of beta rays or electrons. The thickness of the layer 2, which includes the phosphorescent material, may be controlled by the amount of pressure applied between backing layer 1 and the flat surface. In general, the thickness desired depends upon the energy range of the radiation with which the screen is to be employed; as the energy of the incident radiation increases, the desired thickness of the layer 2 increases. For the detection of alpha particles, a thickness from about 0.1 mil to a few tenths of a mil is usually appropriate. A thickness of about a few tenths of a mil to several mils is normally adequate for the detection of beta rays and electrons.

When the phosphor screen of the invention is employed in the detection of alpha particles, it is frequently quite important that the screen be light opaque. The reason for this is that light scintillations, emanating from the rear surface of the screen when alpha particles are impinging upon the front surface of the screen, are employed as a measure of the alpha particle flux. The measurement of the light scintillations is usually accomplished by positioning a phototube or photomultiplier tube in light-tight relationship with the rear surface of the phosphor screen, so that only the light scintillations emanating from the rear of the phosphor screen will enter the phototube. It is readily understood, however, that, if the phosphor screen is light permeable, spurious light signals will fall upon the active surface of the phototube and result in false indications of the alpha particle flux. Accordingly, the present invention contemplates a phosphor screen which is light opaque.

The phosphor screen of the invention may be rendered light opaque by positioning a sheet 3 against the heretofore exposed surface of the layer 2. This is accomplished by placing the sheet 3 over the hereinbefore mentioned flat surface before the layer 2 is compressed. Upon compression of the layer 2 and polymerization of the permafil, the layer 3 adheres to layer 2 as desired. It is obvious that, when layer 3 is utilized, no mold release agent need be applied to the flat surface. The foil 3 preferably consists of aluminum, but may also consist of any metal which is available in thin foil form. The foil should have low stopping power, however, in order that the energy of the radiation incident upon the screen will not be needlessly wasted. Beryllium is a suitable metal of this nature. The thickness of the foil should not exceed a few tenths of a mil, and is preferably of the order of 0.1 mil.

It has been found that thin metal foils employed in conjunction with the invention have numerous minute holes therethrough which permit the passage of a sufficient amount of light to deleteriously affect the sensitive detection of alpha particles. Therefore, according to the invention, a thin layer 4 of an opaque liquid is spread over the exposed surface of foil 3 in any convenient manner such as by painting, spraying, etc. A liquid suitable for this purpose is black india ink, a well-known writing liquid manufactured, for example, by the Keuffel & Esser Company. Other suitable opaque liquids are black mimeograph ink and black printer's ink. After the application of the liquid to the exposed surface of foil 3, the excess may be removed with an absorbent paper tissue to leave the minute holes in foil 3 completely closed by the liquid which soon solidifies. In order to assure the filling of the holes in the foil with the opaque liquid, a wetting or surface-active agent may be mixed with the liquid. Suitable surface-active agents are well-known and may be obtained from the Rohm & Haas Company, Philadelphia, Pa. For mixing with india ink, a 100% concentration or 33% aqueous solution of an alkyl aryl polyether alcohol is satisfactory. With printer's ink a clear amber, viscous liquid containing 77% of a modified phthalic glycerol alkyd resin in ethylene dichloride may be employed.

The phosphor screens prepared as described above in accordance with the invention have a hard surface, and the phosphor particles are held securely in place thus obviating the necessity for protective layers. Moreover, the screens may be formed in any desired shape within a relatively short time.

While my invention has been described by reference to particular embodiments thereof, alternative constructions and methods will readily occur to those skilled in the art. I, therefore, aim in the appended claims to cover all such equivalent embodiments as may be within the true spirit and scope of the foregoing description.

What I claim as new and desire to secure by Letters Patent of the United States is:

1. The method of preparing a phosphor screen which comprises forming a mixture of a comminuted phosphor and an oxygenated monomeric compound, said compound corresponding to the general formula:

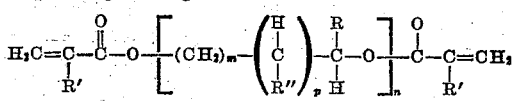

where R is a member selected from the class consisting of hydrogen, —CH$_3$, —C$_2$H$_5$, —CH$_2$OH,

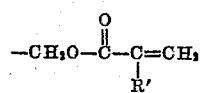

R' is a member selected from the class consisting of hydrogen, chlorine, —CH$_3$, and —C$_2$H$_5$, R'' is a member selected from the class consisting of hydrogen, —OH, and

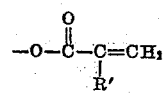

$m$ is an integer equal to at least 1, $n$ is an integer equal to at least 2, and $p$ is one of the following: 0, 1; applying said mixture to a backing layer; and mechanically compressing said mixture to exclude oxygen therefrom to polymerize said monomeric material whereby said comminuted phosphor is retained upon said backing layer to form said phosphor screen.

2. The method of preparing a phosphor screen which comprises forming a mixture of a comminuted phosphor and an oxygenated monomeric compound, said compound corresponding to the general formula:

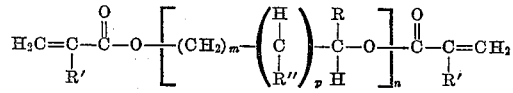

where R is a member selected from the class consisting of hydrogen, —CH₃, —C₂H₅, —CH₂OH,

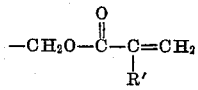

R' is a member selected from the class consisting of hydrogen, chlorine, —CH₃, and —C₂H₅, R" is a member selected from the class consisting of hydrogen, —OH, and

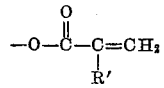

$m$ is an integer equal to at least 1, $n$ is an integer equal to at least 2, and $p$ is one of the following: 0, 1; applying said mixture to a backing layer; and mechanically compressing said mixture by forcing the surface of said backing layer on which said mixture is applied against another surface to exclude oxygen therefrom and polymerize said monomeric compound, whereby said comminuted phosphor is retained upon said backing layer to form said phosphor screen.

3. The method of preparing a phosphor screen which comprises forming a mixture of a comminuted phosphor and a liquid oxygenated tetraethylene glycol dimethacrylate, applying said mixture to a backing layer, and excluding oxygen from said mixture by mechanically compressing said mixture to polymerize said oxygenated tetraethylene glycol dimethacrylate whereby said comminuted phosphor is retained upon said backing layer to form said phosphor screen.

4. The method of preparing a phosphor screen which comprises forming a mixture of a phosphorescent powder and an oxygenated monomeric compound, said compound corresponding to the general formula:

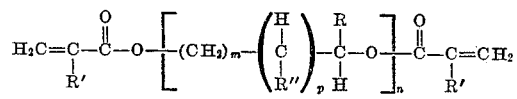

where R is a member selected from the class consisting of hydrogen, —CH₃, —C₂H₅, —CH₂OH,

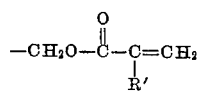

R' is a member selected from the class consisting of hydrogen, chlorine, —CH₃, and —C₂H₅, R" is a member selected from the class consisting of hydrogen, —OH, and

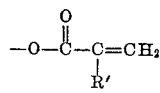

$m$ is an integer equal to at least 1, $n$ is an integer equal to at least 2, and $p$ is one of the following: 0, 1; applying said mixture to a backing layer; compressing said mixture by forcing the surface of said backing layer on which said mixture is applied against another surface to exclude oxygen therefrom and polymerize said monomeric compound; and removing said other surface after said monomeric compound has polymerized to leave said phosphorescent powder retained upon said backing layer.

5. The method of preparing a phosphor screen which comprises forming a mixture of a phosphorescent powder and an oxygenated monomeric compound, said compound corresponding to the general formula:

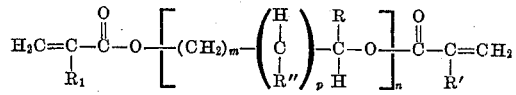

where R is a member selected from the class consisting of hydrogen, —CH₃, —C₂H₅, —CH₂OH,

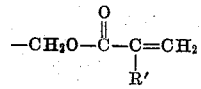

R' is a member selected from the class consisting of hydrogen, chlorine, —CH₃, and —C₂H₅, R" is a member selected from the class consisting of hydrogen, —OH, and

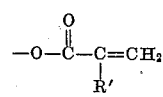

$m$ is an integer equal to at least 1, $n$ is an integer equal to at least 2, and $p$ is one of the following: 0, 1; applying said mixture to a light-transmissible backing layer; compressing said mixture by forcing the surface of said light-transmissible backing layer on which said mixture is applied against another surface to exclude oxygen therefrom and polymerize said monomeric compound; and removing said other surface after said monomeric compound has polymerized to leave said phosphorescent powder retained upon said light-transmissible backing layer.

6. A phosphor screen comprising a backing layer upon a surface of which is deposited a comminuted phosphor embedded in a polymerized oxygenated compound, said compound corresponding to the general formula:

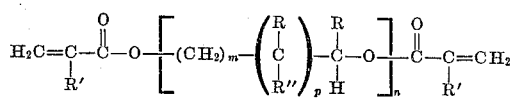

where R is a member selected from the class consisting of hydrogen, —CH₃, —C₂H₅, —CH₂OH,

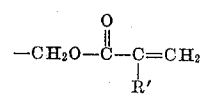

R' is a member selected from the class consisting of hydrogen, chlorine, —CH₃, and —C₂H₅, R" is a member selected from the class consisting of hydrogen, —OH, and

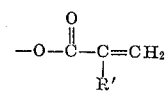

$m$ is an integer equal to at least 1, $n$ is an integer equal to at least 2, and $p$ is one of the following: 0, 1.

7. A phosphor screen comprising a backing layer; a phosphorescent layer including a comminuted phosphor embedded in a polymerized oxygenated compound, said compound corresponding to the general formula:

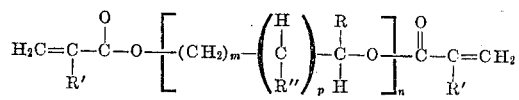

where R is a member selected from the class consisting of hydrogen, —CH₃, —C₂H₅, —CH₂OH,

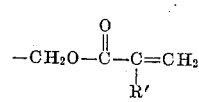

R' is a member selected from the class consisting of hydrogen, chlorine, —CH₃, and —C₂H₅, R″ is a member selected from the class consisting of hydrogen, —OH, and

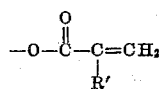

$m$ is an integer equal to at least 1, $n$ is an integer equal to at least 2, and $p$ is one of the following: 0, 1; and a sheet of metal foil attached to the exposed surface of said phosphorescent layer.

8. A phosphor screen comprising a backing layer; a phosphorescent layer including a comminuted phosphor embedded in a polymerized oxygenated compound, said compound corresponding to the general formula:

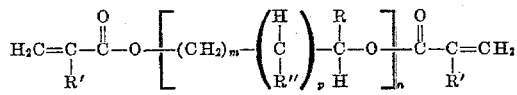

where R is a member selected from the class consisting of hydrogen, —CH₃, —C₂H₅, —CH₂OH,

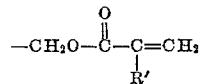

R′ is a member selected from the class consisting of hydrogen, chlorine, —CH₃, and —C₂H₅, R″ is a member selected from the class consisting of hydrogen, —OH, and

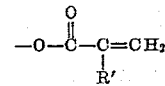

$m$ is an integer equal to at least 1, $n$ is an integer equal to at least 2, and $p$ is one of the following: 0, 1; a sheet of metal foil attached to the exposed surface of said phosphorescent layer, and a solidified deposit of an opaque liquid on said foil to cover minute holes in said foil.

References Cited in the file of this patent

UNITED STATES PATENTS

| | | |
|---|---|---|
| 2,113,090 | McKeag et al. | Apr. 5, 1938 |
| 2,198,373 | Bruson | Apr. 23, 1940 |
| 2,297,048 | Britten et al. | Sept. 29, 1942 |
| 2,303,563 | Law | Dec. 1, 1942 |
| 2,498,592 | Switzer et al. | Feb. 21, 1950 |
| 2,523,132 | Mason et al. | Sept. 19, 1950 |
| 2,559,219 | Ludeman | July 3, 1951 |
| 2,588,569 | Picard | Mar. 11, 1952 |
| 2,616,057 | Coltman | Oct. 28, 1952 |
| 2,628,178 | Burnett et al. | Feb. 10, 1953 |

OTHER REFERENCES

"The Scintillation Counter" by J. W. Coltman, Proceedings of the I. R. E. (Waves and Electrons Section), June 1949, page 676.